United States Patent
Fukushima et al.

(10) Patent No.: US 10,538,162 B2
(45) Date of Patent: Jan. 21, 2020

(54) POWER CONVERSION SYSTEM

(71) Applicants: CENTRAL JAPAN RAILWAY COMPANY, Nagoya-shi (JP); Toshiba Infrastructure Systems & Solutions Corporation, Kawasaki-shi (JP)

(72) Inventors: Takafumi Fukushima, Nagoya (JP); Shigekazu Okada, Nagoya (JP); Kotaro Oda, Nagoya (JP); Yasuomi Maki, Fuchu (JP); Tsunehito Fujita, Fuchu (JP); Hiroaki Otani, Fuchu (JP); Kenichi Kikkawa, Saitama (JP); Manato Mori, Kawasaki (JP)

(73) Assignees: CENTRAL JAPAN RAILWAY COMPANY, Nagoya-shi (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 157 days.

(21) Appl. No.: 15/624,267

(22) Filed: Jun. 15, 2017

(65) Prior Publication Data
US 2017/0361711 A1    Dec. 21, 2017

(30) Foreign Application Priority Data
Jun. 17, 2016    (JP) .................................. 2016-121217

(51) Int. Cl.
*B60L 1/00* (2006.01)
*H02J 4/00* (2006.01)
(Continued)

(52) U.S. Cl.
CPC .................................... *B60L 1/00* (2013.01); *H02J 4/00* (2013.01); *H02J 9/00* (2013.01); *H02M 7/219* (2013.01);
(Continued)

(58) Field of Classification Search
CPC ........ B60L 50/51; B60L 1/00; B60L 2210/40; B60L 3/0092; B60L 9/24; B60L 2200/26;
(Continued)

(56) References Cited

U.S. PATENT DOCUMENTS

| | | | | |
|---|---|---|---|---|
| 2012/0000739 A1* | 1/2012 | Nogi | .......................... | B60L 5/00 |
| | | | | 191/50 |
| 2013/0113279 A1* | 5/2013 | Hatanaka | .................. | B60L 9/22 |
| | | | | 307/9.1 |
| 2019/0036457 A1* | 1/2019 | Kawamura | ............... | B60L 1/00 |

FOREIGN PATENT DOCUMENTS

| | | |
|---|---|---|
| JP | 6-98409 A | 4/1984 |
| JP | 2010-215014 A | 9/2010 |
| JP | 5161816 B2 | 3/2013 |

\* cited by examiner

*Primary Examiner* — Jared Fureman
*Assistant Examiner* — Duc M Pham
(74) *Attorney, Agent, or Firm* — Oblon, McClelland, Maier & Neustadt, L.L.P.

(57) ABSTRACT

A power conversion system includes an AC to DC conversion circuit, a voltage detector, a step-down chopper circuit, a power conversion device for auxiliary power sources, and a control unit. The AC to DC conversion circuit converts AC power supplied from overhead wires via a transformer into DC power. The voltage detector detects a voltage of AC power supplied from the transformer. The step-down chopper circuit steps down the voltage of DC power produced through conversion by the AC to DC conversion circuit. The power conversion device for auxiliary power sources converts the DC power stepped down by the step-down chopper circuit into power for driving loads mounted in an electric vehicle and supplies it to the loads. The control unit controls the AC to DC conversion circuit and the step-down chopper circuit such that the voltage of AC power detected by the voltage detector approaches a reference voltage.

6 Claims, 2 Drawing Sheets

(51) Int. Cl.
  *H02J 9/00* (2006.01)
  *H02M 7/219* (2006.01)
  *H02M 1/32* (2007.01)
  *H02M 7/12* (2006.01)
  *B60L 9/00* (2019.01)
  *H02J 7/34* (2006.01)
  *B60L 53/24* (2019.01)
  *H02P 27/06* (2006.01)
  *H02M 1/00* (2006.01)

(52) U.S. Cl.
  CPC ....... *B60L 2210/30* (2013.01); *B60L 2210/40* (2013.01); *H02P 27/06* (2013.01)

(58) Field of Classification Search
  CPC .... B60L 58/10; Y02T 10/7241; H02M 7/219; H02J 4/00; H02P 27/06
  See application file for complete search history.

POWER CONVERSION SYSTEM

BACKGROUND

Technical Field

Embodiments of the present invention relate to a power conversion system.

Related Art

The power conversion device converts alternating current power supplied from overhead wires into direct current power and supplies power to loads mounted in an electric vehicle on the basis of the converted power. In such a power conversion device, when the alternating current power supplied from the overhead wires varies, the converted direct current power also varies, and therefore there is a need to choose its constituent parts in consideration of the variation of direct current power. Japanese Unexamined Patent Application, First Publication No. 2010-215014 discloses a power conversion device convert of the related art.

DETAILED DESCRIPTION OF THE INVENTION

Hereinafter, a power conversion system according to embodiments will be described with reference to the drawings.

Embodiment

Figure 1:
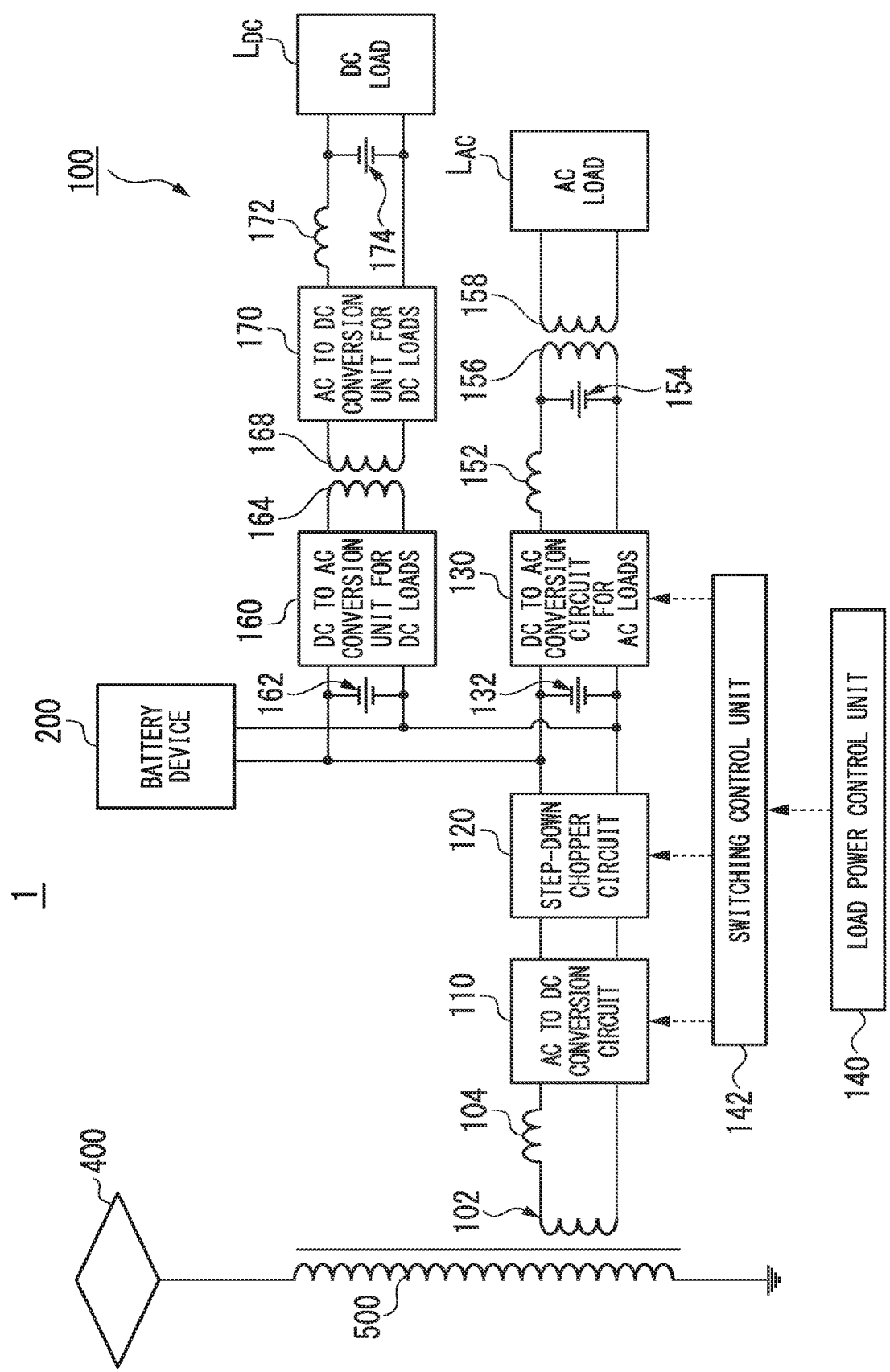
FIG. 1 is a diagram showing an example of a power conversion system 1 according to an embodiment.

FIG. 1 is a diagram showing an example of a power conversion system 1 according to an embodiment. The power conversion system 1 is mounted, for example, in a railway vehicle. The railway vehicle is an example of an electric vehicle. Alternating current (AC) power is supplied to the power conversion system 1 from overhead wires via a power collector 400 and windings for loads 500 and 102 of a transformer. The power conversion system 1 converts the AC power into AC power for loads and supplies the AC power for loads to an AC load $L_{AC}$. High-voltage AC power is also supplied to the power conversion system 1 through another transformer and the power conversion system 1 then converts the high-voltage AC power and supplies the converted power to a travel motor. This allows the power conversion system 1 to cause the travel motor to generate a travel torque, enabling travel of the railway vehicle. The voltage of the AC power supplied to the transformer 102 is lower than that of the high-voltage AC power. In the embodiment, the AC load $L_{AC}$ is a load of the railway vehicle other than the travel motor, and is, for example, an electronic device or the like that operates with an AC voltage of 100 V. In addition, the power conversion system 1 converts the low-voltage AC power into direct current (DC) power for loads and supplies the DC power for loads to a DC load $L_{DC}$. This allows the power conversion system 1 to drive the DC load $L_{DC}$. In the embodiment, the DC load $L_{DC}$ is a load of the railway vehicle other than the travel motor, and is, for example, an electronic device that operates with a DC voltage.

The power conversion system 1 includes, for example, a power conversion device for auxiliary power sources 100 and a battery device 200.

The power conversion device for auxiliary power sources 100 includes, for example, an AC to DC conversion circuit 110, a step-down chopper circuit 120, a DC to AC conversion circuit for AC loads 130, a load power control unit 140, a switching control unit 142, a DC to AC conversion unit for DC loads 160, and an AC to DC conversion unit for DC loads 170.

Figure 2:
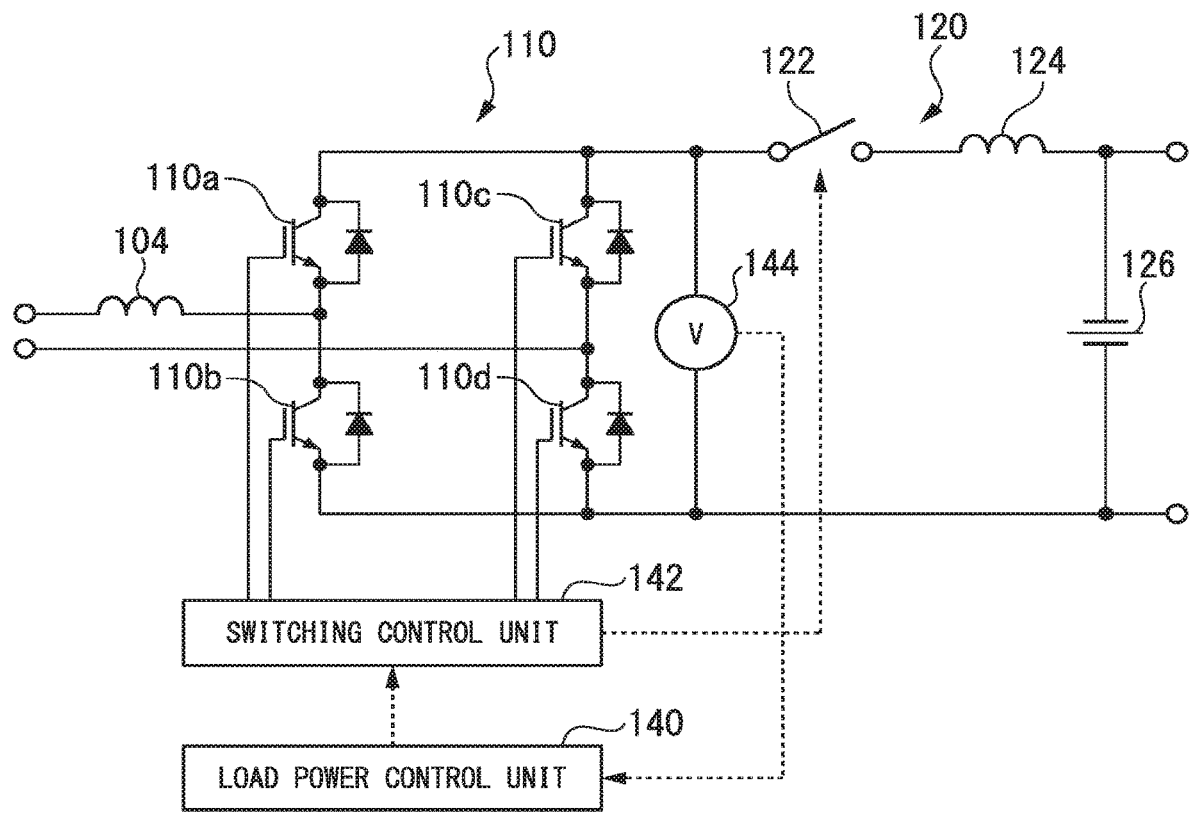
FIG. 2 is a diagram showing examples of an alternating current to direct current conversion circuit and a step-down chopper circuit according to the embodiment.

The AC to DC conversion circuit 110 converts the AC power supplied from the overhead wires via the transformer into DC power. The step-down chopper circuit 120 steps down the voltage of the DC power produced through conversion by the AC to DC conversion circuit 110. FIG. 2 is a diagram showing examples of the AC to DC conversion circuit 110 and the step-down chopper circuit 120.

The AC to DC conversion circuit 110 includes, for example, switching elements 110a, 110b, 110c, and 110d. The switching elements 110a, 110b, 110c, and 110d are connected between a positive electrode line and a negative electrode line. The switching elements 110a, 110b, 110c and 110d are, for example, insulated gate bipolar transistors (IGBTs) incorporating diodes connected in antiparallel. The switching elements 110a, 110b, 110c, and 110d may also be other types of switching elements.

The step-down chopper circuit 120 includes, for example, a switch portion 122, a coil 124, and a capacitor 126. The switch portion 122 may be a mechanical switch, but the present invention is not limited to this and the switch portion 122 may also be an IGBT. The coil 124 is connected in series with the switch portion 122. The capacitor 126 is connected between a positive electrode line and a negative electrode line.

The DC to AC conversion circuit for AC loads 130 is a switching circuit including a plurality of switching elements bridge-connected between a positive electrode line and a negative electrode line to which power is supplied. The DC to AC conversion circuit for AC loads 130 is also called an inverter. The switching elements are, for example, IGBTs. Other types of switching elements may also be used as the switching elements. Under the control of the load power control unit 140, the DC to AC conversion circuit for AC loads 130 arbitrarily switches the switching elements between a conductive state and a non-conductive state to convert the DC power into AC power for loads.

A capacitor 132 is connected to the DC to AC conversion circuit for AC loads 130 at its side of the AC to DC conversion circuit 110 in parallel with the AC to DC conversion circuit 110 and the DC to AC conversion circuit for AC loads 130. The capacitance of the capacitor 132 is set to a level allowing the DC to AC conversion circuit for AC loads 130 to supply stable power to the AC load $L_{AC}$. That is, the capacitance of the capacitor 132 need not be set so high that it can compensate for absence of the supply of AC power for loads to the AC load $L_{AC}$ when the railway vehicle travels in non-electric sections where the power collector 400 stops supplying AC power. The non-electric sections are provided, for example, at intervals of a predetermined distance in sections where the railway vehicle travels.

The AC power produced through conversion by the DC to AC conversion circuit for AC loads 130 is supplied to the AC load $L_{AC}$ via a coil 152, a capacitor 154, and a transformer 156 and 158.

The AC to DC conversion circuit 110 and the step-down chopper circuit 120 are connected to the load power control unit 140, the switching control unit 142, and a voltage detector 144 as shown in FIG. 2. The voltage detector 144 detects the voltage of a DC link between the step-down chopper circuit 120 and the DC to AC conversion circuit for AC loads 130.

The switching control unit 142 provides gate signals to the gates of the switching elements 110*a*, 110*b*, 110*c*, and 110*d* on the basis of a command voltage supplied from the load power control unit 140 and provides an on/off control signal to the switch portion 122. This allows the switching control unit 142 to convert AC power into DC power using the AC to DC conversion circuit 110. The switching control unit 142 also steps down the voltage of the DC power produced through conversion by the AC to DC conversion circuit 110 using the step-down chopper circuit 120.

The load power control unit 140 is realized by a processor such as a central processing unit (CPU) executing a program stored in a program memory. In addition, some or all of these functional units may be realized by hardware such as large scale integration (LSI), an application specific integrated circuit (ASIC), a field-programmable gate array (FPGA), or the like. The load power control unit 140 operates, for example, by being supplied with the operating power of 100 V produced through conversion by the power conversion device for auxiliary power sources 100. The load power control unit 140 controls the AC to DC conversion circuit 110, the step-down chopper circuit 120, the DC to AC conversion circuit for AC loads 130, the DC to AC conversion unit for DC loads 160, and the AC to DC conversion unit for DC loads 170.

Similar to the DC to AC conversion circuit for AC loads 130 described above, the DC to AC conversion unit for DC loads 160 is a switching circuit including a plurality of switching elements bridge-connected between a positive electrode line and a negative electrode line to which power is supplied. The DC to AC conversion unit for DC loads 160 converts DC power into AC power by switching the switching elements between a conductive state and a non-conductive state.

A capacitor 162 is connected to the DC to AC conversion unit for DC loads 160 at its side of the step-down chopper circuit 120. The capacitance of the capacitor 162 is set to a level allowing the DC to AC conversion unit for DC loads 160 to supply stable power to the AC to DC conversion unit for DC loads 170 downstream thereof. The capacitance of the capacitor 162 may be the same as or different from that of the capacitor 132.

The AC power produced through conversion by the DC to AC conversion unit for DC loads 160 is supplied to the AC to DC conversion unit for DC loads 170 via the transformer 164 and 166. The transformer 164 and 166, for example, steps down the voltage of the AC power produced through conversion by the DC to AC conversion unit for DC loads 160 to about 100 V.

The AC to DC conversion unit for DC loads 170 converts the AC power supplied from the DC to AC conversion unit for DC loads 160 via the transformer 164 and 166 into DC power. For example, the AC to DC conversion unit for DC loads 170 converts the AC power into DC power. Similar to the AC to DC conversion circuit 110, the AC to DC conversion unit for DC loads 170 may be configured as shown in FIG. 2 described above.

The DC power produced through conversion by the AC to DC conversion unit for DC loads 170 is supplied to the DC load $L_{DC}$ via a coil 172 and a capacitor 174.

The battery device 200 is connected to power lines which connect DC power output terminals of the step-down chopper circuit 120 and DC power input terminals of both the DC to AC conversion circuit for AC loads 130 and the DC to AC conversion unit for DC loads 160. The battery device 200 is, for example, a battery having a low insulated separation voltage. The battery device 200 is, for example, a storage battery unit in which storage battery cells such as lithium ion batteries are connected in series or in parallel.

Figure 3:
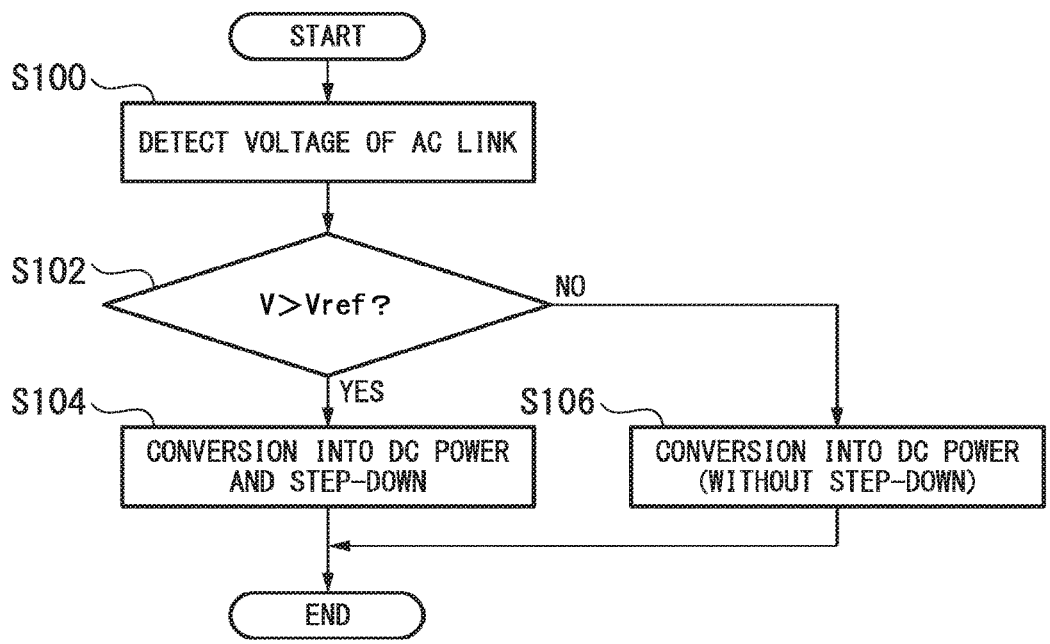
FIG. 3 is a flowchart showing examples of operations of the alternating current to direct current conversion circuit and the step-down chopper circuit 120 according to the embodiment.

When the DC power supplied from the step-down chopper circuit 120 to the DC to AC conversion circuit for AC loads 130 and the DC to AC conversion unit for DC loads 160 is reduced, the battery device 200 discharges power corresponding to the reduction of the DC power. This allows the battery device 200 to supply the discharge power to the DC to AC conversion circuit for AC loads 130 and the DC to AC conversion unit for DC loads 160 when the railway vehicle travels in non-electric sections FIG. 3 is a flowchart showing examples of operations of the AC to DC conversion circuit 110 and the step-down chopper circuit 120 according to the embodiment. A procedure of this flowchart is repeatedly performed while the railway vehicle is traveling. First, the voltage detector 144 detects the voltage of the DC link (step S100). The load power control unit 140 then determines whether or not the voltage V detected by the voltage detector 144 is higher than a reference voltage Vref (step S102). The reference voltage Vref is set to the rated voltage of the load L by a designer of the railway vehicle. The reference voltage Vref is set, for example, to 400 V as the rated voltage of the load L when the voltage of AC power supplied from the transformer 102 varies over a range of 200 V to 500 V.

The reference voltage Vref may also be determined based on the rated voltage of the load L and the breakdown voltage of the switching elements of the DC to AC conversion circuit for AC loads 130. For example, the reference voltage Vref is set to a value for limiting the voltage of DC power supplied to the DC to AC conversion circuit for AC loads 130 such that the insulated separation voltages of the switching elements are not high.

When the voltage V of the DC link is higher than the reference voltage Vref, the load power control unit 140 steps down the output voltage of the AC to DC conversion circuit 110 such that it approaches the reference voltage Vref. When the voltage of the DC link has not reached the reference voltage Vref with the control of the AC to DC conversion circuit 100 alone even though it has approached the reference voltage Vref, the load power control unit 140 further controls the step-down chopper circuit 120 to step down the voltage of AC power such that it approaches the reference voltage Vref (step S104).

When the voltage V of the DC link is equal to or less than the reference voltage Vref, the load power control unit 140 allows the AC to DC conversion circuit 110 to convert the AC power supplied from the transformer 102 into DC power (step S106). In this case, the load power control unit 140 controls the AC to DC conversion circuit 110 to step up the voltage of AC power such that it approaches the reference voltage Vref.

According to the power conversion system 1 described above, the AC to DC conversion circuit 110 and the step-down chopper circuit 120 are controlled such that the voltage of the DC link approaches the reference voltage and therefore it is possible to make power supplied from the overhead wires more stable. Thus, according to the power conversion system 1, it is possible to easily choose the switching elements of the DC to AC conversion circuit for AC loads 130 and the DC to AC conversion unit for DC loads 160 to which DC power is supplied from the step-down chopper circuit 120. That is, according to the power conversion system 1, the switching elements of the DC to AC conversion circuit for AC loads 130 and the DC to AC conversion unit for DC loads 160 need not correspond to the range of variation of the voltage of AC power supplied from the transformer 102. In addition, according to the power conversion system 1, AC power into which stabilized DC power has been converted can be supplied to the loads L and therefore it is possible to allow the loads L to operate stably. Further, according to the power conversion system 1, stabilized DC power can be supplied to the battery device 200 and therefore it is possible to prevent supply of overvoltage to the battery device 200, thereby protecting the battery device 200.

For example, in the case where the voltage of AC power supplied from the power collector 400 varies over a range of 200 V to 500 V, it is necessary to design the switching elements of the DC to AC conversion circuit for AC loads 130 and the DC to AC conversion unit for DC loads 160, the AC load $L_{AC}$, the DC load $L_{DC}$, and the battery device 200 such that they operate normally at 500 V without the transformer 102 being provided. On the other hand, according to the power conversion system 1, the transformer 102 is provided in addition to the AC to DC conversion circuit for AC loads 110 and therefore it is possible to design the switching elements of the DC to AC conversion circuit for AC loads 130 and the DC to AC conversion unit for DC loads 160, the AC load $L_{AC}$, the DC load $L_{DC}$, and the battery device 200 such that they operate normally at up to 400 V.

Furthermore, according to the power conversion system 1, when the voltage of the DC link is lower than the reference voltage, it is possible to step up the voltage of the DC link such that it approaches the reference voltage using the AC to DC conversion circuit 110. In addition, according to the power conversion system 1, when the voltage of the DC link is higher than the reference voltage, it is possible to step down the voltage of the DC link produced through conversion by the AC to DC conversion circuit 110 such that it approaches the reference voltage using the step-down chopper circuit 120. Thus, according to the power conversion system 1, it is possible to supply stable DC power to the DC to AC conversion circuit for AC loads 130 and the DC to AC conversion unit for DC loads 160 either when the voltage of the DC link is higher than the reference voltage or when the voltage of the DC link is lower than the reference voltage.

According to at least one of the embodiments described above, an AC to DC conversion circuit 110 configured to convert AC power supplied via a transformer 102 into DC power, a step-down chopper circuit 120 configured to step down a voltage of the DC power produced through conversion by the AC to DC conversion circuit 110, and a load power control unit 140 configured to control the AC to DC conversion unit 110 and the step-down chopper circuit 120 such that the voltage of the DC link approaches a reference voltage are provided and therefore it is possible to make power supplied from overhead wires more stable.

While some embodiments of the invention have been described, these embodiments have been set forth as examples without the intention to limit the scope of the invention. These embodiments can be practiced in various other forms, and various omissions, substitutions, and changes can be made without departing from the nature of the invention. The embodiments and modifications thereof are included in the scope and nature of the invention and are also similarly included in the invention described in the claims and equivalent scopes thereof.

What is claimed is:

1. A power conversion system comprising:
    a transformer configured to step down power from an overhead wire;
    an alternating current to direct current conversion circuit configured to convert alternating current power supplied via a secondary winding of the transformer into direct current power;
    a step-down chopper circuit connected to the alternating current to direct current conversion circuit, the step-down chopper circuit being configured to step down a voltage of the direct current power produced through conversion by the alternating current to direct current conversion circuit;
    a first power conversion unit for alternating current loads, the first power conversion unit being connected to the step-down chopper circuit, the first power conversion unit configured to convert the direct current power stepped down by the step-down chopper circuit into alternating current power for driving an alternating current load mounted in an electric vehicle and to supply the alternating current power to the alternating current load;
    a voltage detector connected between the step-down chopper circuit and the alternating current to direct current conversion circuit, the voltage detector configured to detect a voltage of a direct current link between the step-down chopper circuit first power conversion unit for alternating current loads;
    a second power conversion unit for direct current loads, the second power conversion unit being connected to the step-down chopper circuit, the second power conversion unit being configured to convert the direct current power stepped down by the step-down chopper circuit into direct current power for driving a direct current load mounted in the electric vehicle and to supply the direct current power to the direct current load; and
    a control unit connected to the alternating current to direct current conversion circuit and connected to the step-down chopper circuit ,the control unit being configured to control the alternating current to direct current conversion circuit and the step-down chopper circuit such that the voltage of the direct current link detected by the voltage detector approaches a reference voltage.

2. The power conversion system according to claim 1, wherein the control unit is configured to step up the alternating current power supplied via the transformer from the overhead wire such that a voltage of the alternating current power approaches the reference voltage using the alternating current to direct current conversion circuit when the voltage of the alternating current power detected by the voltage detector is lower than the reference voltage.

3. The power conversion system according to claim 2, wherein the control unit is configured to step down the voltage of the direct current power produced through conversion by the alternating current to direct current conversion circuit such that the voltage of the direct current power approaches the reference voltage using the step-down chopper circuit when the voltage of the alternating current power detected by the voltage detector is higher than the reference voltage.

4. The power conversion system according to claim 1, wherein the alternating current to direct current conversion circuit includes a switching circuit including a plurality of switching elements and diodes connected in antiparallel with the plurality of switching elements, the step-down chopper circuit includes a switch portion, a coil, and a capacitor, and the control unit is configured to switch each of the plurality of switching elements and the switch portion between a conductive state and a non-conductive state to step up alternating current power supplied from the overhead wire via the transformer such that the voltage of the alternating current power approaches the reference voltage using the alternating current to direct current conversion circuit and to step down the voltage of the direct current power produced through conversion by the alternating current to direct current conversion circuit such that the voltage of the direct current power approaches the reference voltage using the step-down chopper circuit.

5. The power conversion system according to claim 1, wherein each of the first power conversion unit for alternating current loads and the second power conversion unit for direct current loads includes a plurality of switching elements, and the reference voltage is determined based on a breakdown voltage of the switching elements and a rated voltage of at least one of the loads.

6. The power conversion system according to claim 1, further comprising an electrical storage device connected to a power line connecting a direct current power output terminal of the step-down chopper circuit and direct current power input terminals of the power conversion unit for alternating current loads and the power conversion unit for direct current loads, the electrical storage device being configured to discharge power corresponding to a reduction in direct current power supplied from the transformer to the alternating current to direct current conversion circuit when the reduction of the direct current power has occurred.

* * * * *